Sept. 2, 1924.
W. LAUBER
TOOL HANDLE FERRULE
Filed Aug. 28, 1922
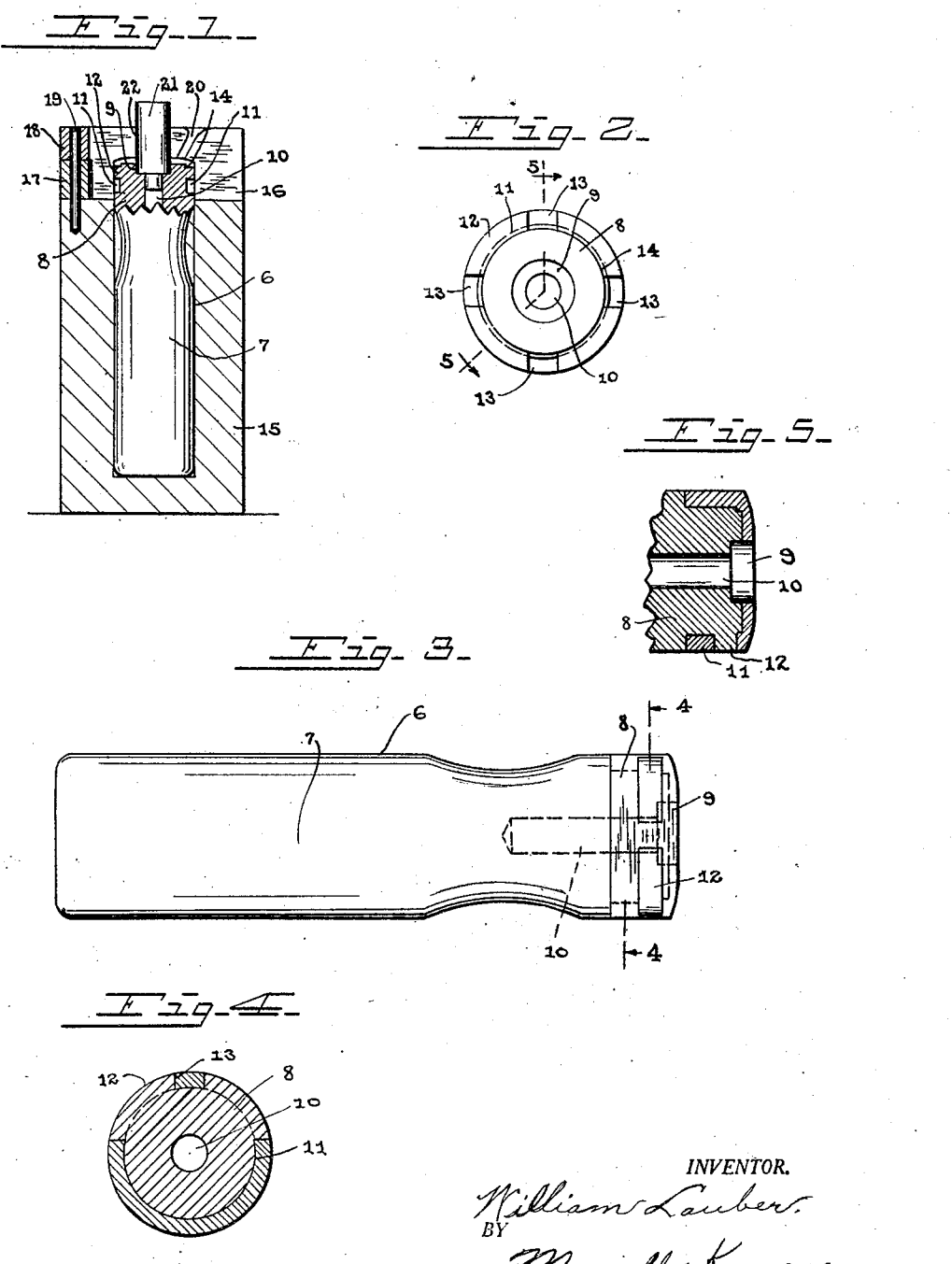
INVENTOR.
William Lauber.
BY
Morsell & Keeney.
ATTORNEYS.

Patented Sept. 2, 1924.

1,507,071

UNITED STATES PATENT OFFICE.

WILLIAM LAUBER, OF MILWAUKEE, WISCONSIN.

TOOL-HANDLE FERRULE.

Application filed August 28, 1922. Serial No. 584,802.

*To all whom it may concern:*

Be it known that I, WILLIAM LAUBER, a citizen of the United States, and resident of Milwaukee, in the county of Milwaukee and State of Wisconsin, have invented new and useful Improvements in Tool-Handle Ferrules, of which the following is a description, reference being had to the accompanying drawings, which are a part of this specification.

This invention relates to improvements in tool handles, and more particularly to tool handle ferrules.

It is one of the objects of the present invention to provide a tool handle having a ferrule which will prevent the handle from splitting when a tool is inserted therein.

A further object of the invention is to provide a tool handle having a ferrule which will prevent the handle from burning when the handle is used as a handle for soldering irons.

A further object of the invention is to provide a tool handle having a ferrule which is neat in appearance and which can be easily and cheaply provided.

A further object of the invention is to provide a tool handle having a ferrule in which means are provided whereby a tool may be easily, quickly and firmly secured in the handle.

With the above and other objects in view, the invention consists of the improved tool handle ferrule and its parts and combinations as set forth in the claims and all equivalents thereof.

In the accompanying drawing in which the same reference characters indicate the same parts in all of the views:

Fig. 1 is a transverse sectional view of a mold having therein a tool handle ready to receive poured metal to form the improved ferrule;

Fig. 2 is a top view of a tool handle which is to be provided with the improved ferrule, showing its formation, before the metal has been poured;

Fig. 3 is a side view of a tool handle provided with the improved ferrule;

Fig. 4 is a sectional view thereof taken on line 4—4 of Fig. 3; and

Fig. 5 is a fragmentary sectional view taken on line 5—5 of Fig. 2.

Referring to the drawing, the numeral 6 represents a tool handle preferably formed of wood, and having a shank portion 7 and a head portion 8 provided with an aperture 9. The aperture 9 extends to a second aperture 10 in alinement therewith, the aperture 10 being preferably of slightly smaller diameter than the aperture 9 so that when the shank of a tool (not shown) is inserted therein, the tapered sides thereof will, when driven in, have a secure engagement with the walls of the handle surrounding said apertures. With this arrangement, the shank of the tool has a double engagement as it bites into the walls of aperture 10 and also into those of aperture 9. In the event that the shank of the tool is too large for aperture 10, the walls of aperture 10 may be cut away until a proper and snug engagement is secured, this being easily accomplished because of the difference in diameter of apertures 9 and 10.

Head portion 8 of tool handle 6 is further provided with an annular groove 11 comparatively near its extremity which also forms an annular or segmental ridge 12. Annular ridge 12 is divided by four spaced longitudinally extending grooves 13 which communicate with groove 11 and the extremity of head portion 8. At the very extremity of head portion 8, ridge 12 is cut down to form a narrow circumferential shoulder 14.

In forming the handle by the improved method, the tool handle 6 is placed in a proper mold so that its head portion 8 will be enclosed in the split end section 16 which is adapted to swingingly open or close by means of hinges 17 and 18 and pin 19. Split end portion 16 is further provided with an aperture 20 for receiving molten metal which is comparatively soft when cooled, and a plug 21 is provided to fit through an opening 22 and plug up apertures 9 and 10 of the tool handle head portion 8. Into this mold, then, and through aperture 20, molten metal is poured, which fills up annular groove 11, longitudinally extending grooves 13 and covers the entire end of head portion 8 except apertures 9 and 10 which are plugged. The metal forms flush with the adjoining portions of shank 7 and ridge 12, and a neat appearing, strong and efficient ferrule is thus formed, as best shown in Fig. 3.

From the foregoing description, it will be seen that the improved tool handle ferrule is of very simple construction, and is well adapted for the purposes described.

What I claim as my invention is:

1. A tool handle, comprising a handle member having an annular groove spaced from one end of the handle and longitudinal grooves communicating therewith, and a metallic ferrule member secured on said handle member and entering said grooves and covering one end of said handle member, said ferrule member having an annular band portion filling said annular groove at a distance from the end of the handle to protect the handle against splitting.

2. A tool handle, comprising a wooden handle member having projecting portions, an annular groove spaced from the handle end, and a plurality of spaced longitudinal grooves dividing said projecting portions and communicating with said annular groove, on one end of its shank, and a metallic ferrule member secured on and covering one end of said handle member and a portion of the shank thereof, said ferrule member filling said grooves and being flush with the tool handle shank and also being prevented from rotation by means of said projections, and said handle member being further provided with an aperture at its ferrule equipped end.

In testimony whereof, I affix my signature.

WILLIAM LAUBER